(12) United States Patent
Kaufman

(10) Patent No.: US 7,172,240 B1
(45) Date of Patent: Feb. 6, 2007

(54) ONE-PIECE WIND DEFLECTOR FOR SPANNING MULTIPLE-PANED VEHICLE WINDOW

(75) Inventor: Judd C. Kaufman, Chicago, IL (US)

(73) Assignee: David F. MacNeil, Hinsdale, IL (US)

( * ) Notice: Subject to any disclaimer, the term of this patent is extended or adjusted under 35 U.S.C. 154(b) by 0 days.

(21) Appl. No.: 11/335,085

(22) Filed: Jan. 19, 2006

(51) Int. Cl.
*B60J 1/20* (2006.01)

(52) U.S. Cl. ............... 296/152; 296/154; 454/131

(58) Field of Classification Search .......... 296/180.1, 296/152, 154, 91, 95.1; 454/131, 133; D12/181, D12/182, 183
See application file for complete search history.

(56) References Cited

U.S. PATENT DOCUMENTS

| | | | | |
|---|---|---|---|---|
| 1,967,504 | A | * | 7/1934 | Gaughran, Jr. et al. ..... 454/133 |
| 3,866,524 | A | * | 2/1975 | Forbes, Jr. .................. 454/131 |
| 4,558,633 | A | * | 12/1985 | Lingg ......................... 454/131 |
| 4,685,718 | A | * | 8/1987 | Steenblik et al. ........... 296/154 |
| 5,251,953 | A | * | 10/1993 | Willey ........................ 296/152 |
| 5,676,418 | A | * | 10/1997 | Strefling ................... 296/180.1 |
| 5,797,645 | A | * | 8/1998 | Schenk et al. .............. 296/152 |
| 6,350,195 | B1 | * | 2/2002 | Iino ............................ 454/131 |
| 6,557,927 | B2 | * | 5/2003 | Kanie ......................... 296/152 |
| 2006/0208530 | A1 | * | 9/2006 | Mishimagi ................. 296/152 |

OTHER PUBLICATIONS

Pictures from JC Whitney website, printed Oct. 1, 2006.*
MacNeil Automotive Products, Limited, Deflector Installation Instructions, Downloaded from http.//www.weathertech.com/pdf/wfinstr2-02.pdf on Oct. 26, 2005.

* cited by examiner

*Primary Examiner*—Jason Morrow
(74) *Attorney, Agent, or Firm*—Momkus McCluskey; Jefferson Perkins

(57) ABSTRACT

A vehicle window wind deflector, of the type which has a flange that is fitted into a window channel, has a bridge which fits around a pillar that separates a first pane of the vehicle window from a second pane of the vehicle window. At the location of the pillar it is preferred that the flange be interrupted.

12 Claims, 5 Drawing Sheets

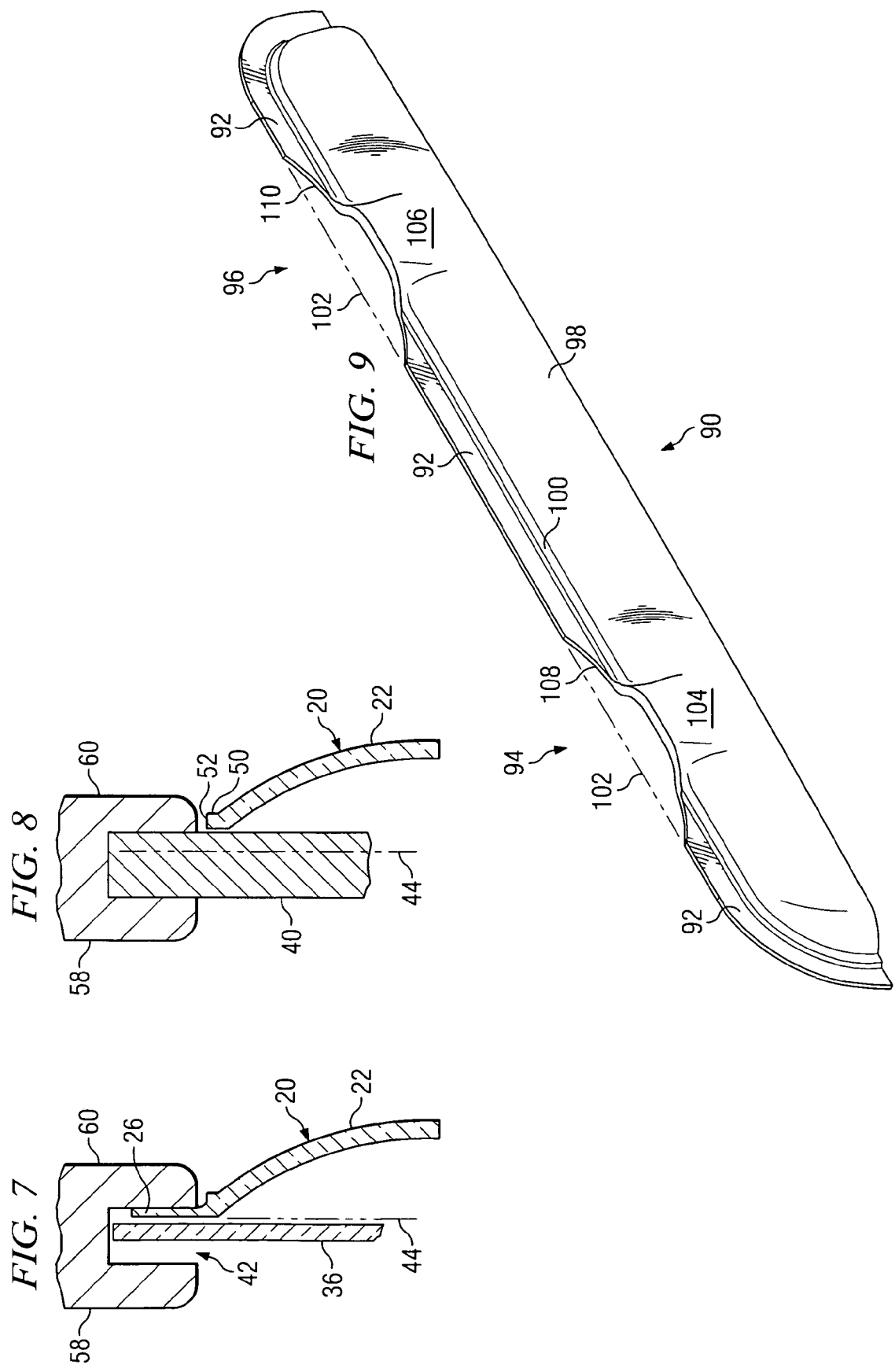

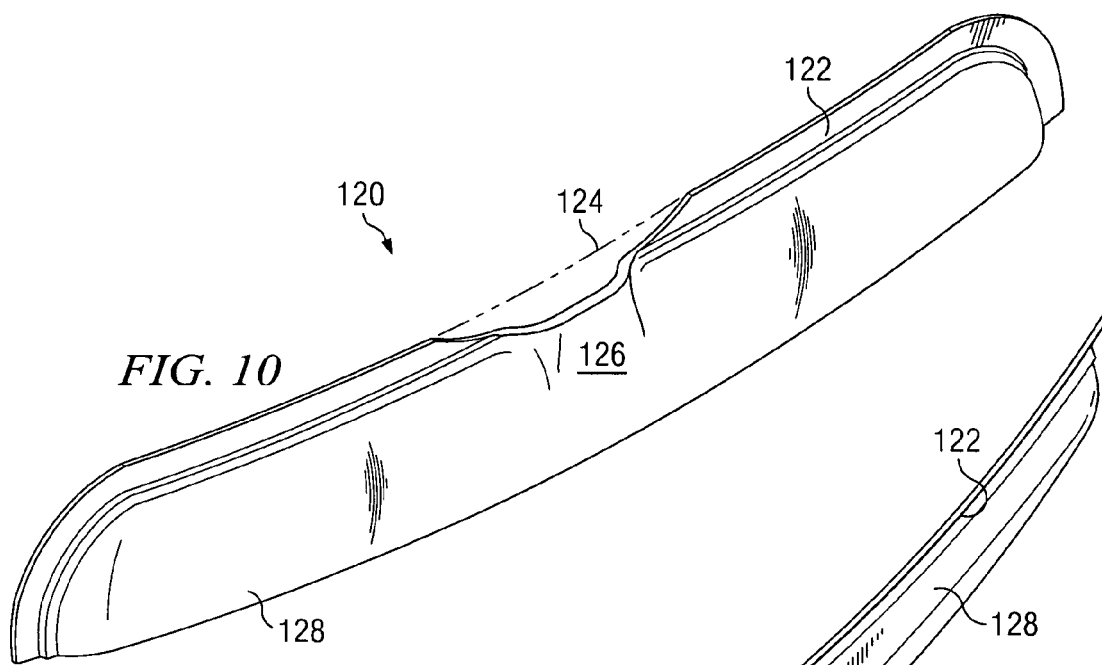
FIG. 10
FIG. 11
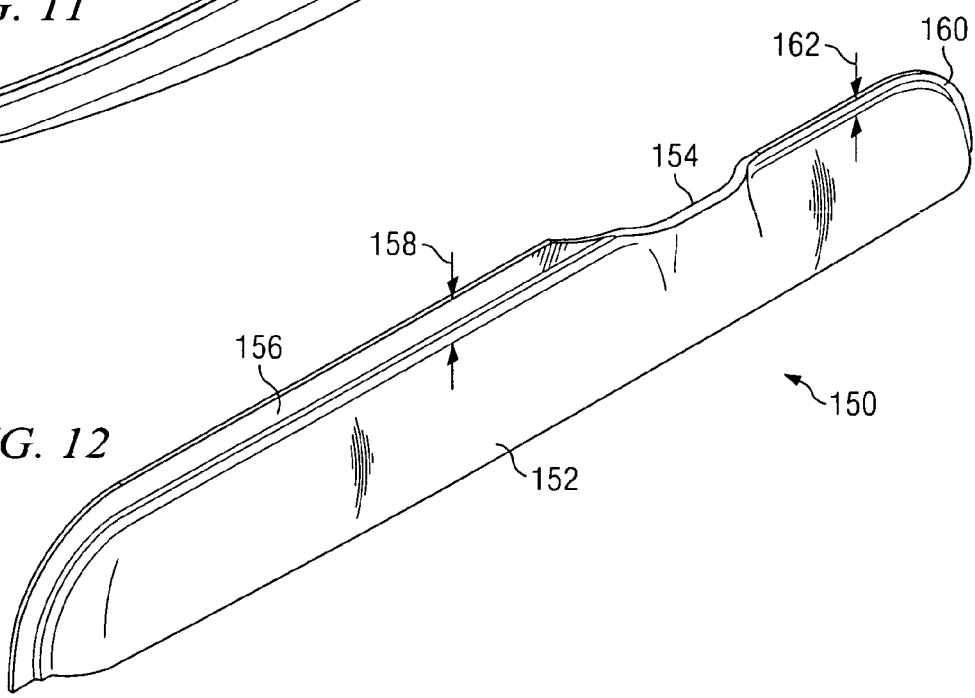
FIG. 12

ONE-PIECE WIND DEFLECTOR FOR SPANNING MULTIPLE-PANED VEHICLE WINDOW

BACKGROUND OF THE INVENTION

Contemporary motor vehicles usually are fitted with glass windows. Many of these windows, such as at least some of the side windows and sometimes even the rear window, can be selectively lowered to permit the entry of outside air. In most vehicle doors, these windows can be lowered, partially or all the way, into a hollow space in the door beneath the windows proper, and are raised to a closed condition by entering into a channel formed in the top of the vehicle door.

Automotive aftermarket suppliers have devised wind deflectors that permit e.g. a side window to be lowered by a small amount, permitting ventilation of the interior, but which still keep most or all of the rain out of the car interior, and which also deflect most of the wind passing by the car. One successful wind deflector is manufactured by the German Company ClimAir. This deflector is manufactured of a hard, machineable, transparent and paintable plastic such as acrylic. It has a relatively thin, machined peripheral flange at its top and side margins which slides or installs into the door channel in a position outboard of the door glass, providing a superior fit and means of attachment.

Many vehicle designs, however, have their vehicle door windows partitioned into a first pane which lowers into the door and a second pane which remains stationary. These panes are separated by a substantially vertical pillar that extends from the lower window margin upward and into the top window channel. The aforementioned in-channel deflector design does not allow the deflector to span the entire length (in a fore and aft direction) of a window utilizing a multi-pane design. To provide wind and rain deflectors for such a vehicle, the supplier either has to ignore the second pane of the window or provide a deflector for each pane. A need has therefore arisen to provide for a snap-in deflector which can span multiple-paned vehicle windows.

SUMMARY OF THE INVENTION

According to one aspect of the present invention, a wind deflector is provided to fit a vehicle that has a window with at least first and second panes, the panes being separated by an elongated and substantially upright pillar. The deflector has a body with an upper margin. This upper margin, in use, conforms to a conceptual, preferably substantially flat and preferably substantially vertically oriented window channel surface. Extending upwardly along this predetermined but hypothetical surface from the upper margin of the body is a flange that is designed to be received into a window channel of a vehicle. The body includes a bridge which fits around the pillar. This bridge extends in an outboard direction from the conceptual vehicle window channel surface. The bridge is positioned along the length of the upper margin such that it will register with and fit around the window pillar once the deflector is installed. Preferably, the flange is fitted into the window channel on both sides of the pillar. Preferably, the flange is interrupted at the location of the bridge.

The transition of the deflector flange at the point of its interruption can take any of several convenient shapes. One such shape is an arc. Other shapes may be selected to aid the consumer in registering the bridge of the deflector with the window pillar and to minimize exposure to the elements. In one embodiment, the deflector has one such bridge, such that the deflector is installed around one corresponding pillar. In other embodiments, the deflector may be formed to have two or more such bridges at separate locations, so as to fit to a vehicle window having two or more pillars and three or more panes.

BRIEF DESCRIPTION OF THE DRAWINGS

These and other aspects of the invention may be best appreciated by reviewing the detailed description below, when read in conjunction with the drawings, in which like characters denote like parts and in which:

FIG. 7 is a transverse sectional view taken substantially along line 7—7 of FIG. 2 and line 7—7 of FIG. 6, and showing a vehicle door window in a raised position;

FIG. 8 is a transverse sectional view taken substantially along line 8—8 of FIG. 2 and line 8—8 of FIG. 6, and showing a vehicle door window in a raised position;

FIG. 9 is an isometric view of a two-bridge embodiment of the present invention;

FIG. 10 is an isometric view of an alternative embodiment of the invention in which a deflector flange conforms to a convexly curved conceptual vehicle window channel surface;

FIG. 11 is a top view of the deflector shown in FIG. 10; and

FIG. 12 is an isometric view of another embodiment of the invention.

DETAILED DESCRIPTION

Figure 1:
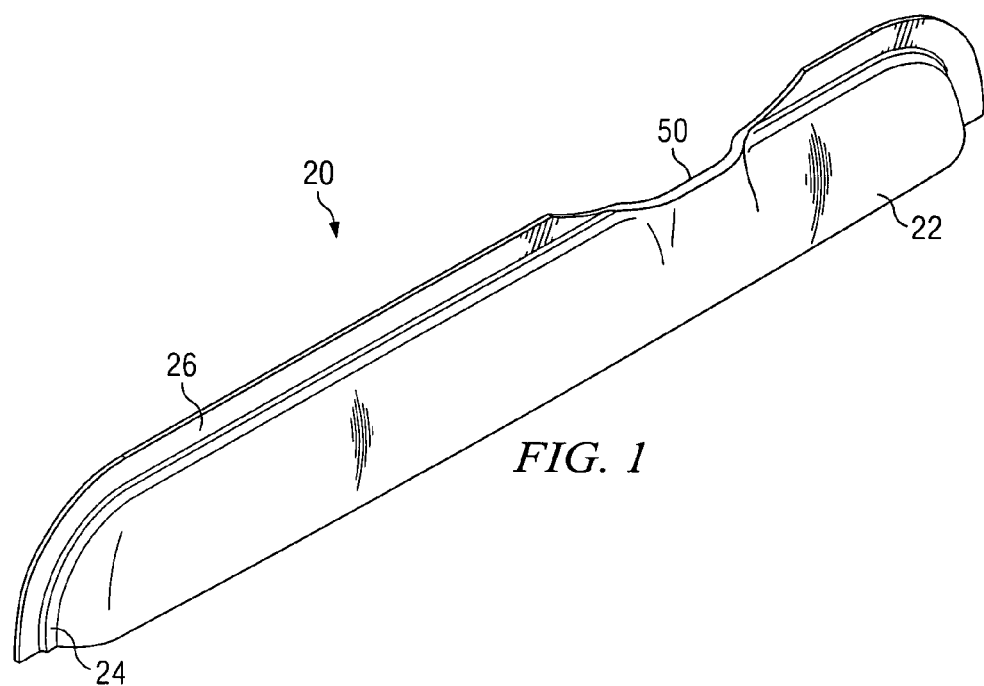
FIG. 1 is an isometric view of a wind deflector according to a first embodiment of the invention.

FIG. 1 is an isometric view of a wind deflector 20 which incorporates the invention. It is preferred that the wind deflector be molded as a single piece and that it be formed of a tough, transparent plastic, such as an acrylic. The deflector 20 has two main parts: a body 22, which bulges in an outboard and downward direction from an upper margin 24 thereof and which preferably has a convex shape, and a flange 26, which extends upwardly and (in most instances) forwardly and rearwardly from the body upper margin 24. "Forwardly" and "rearwardly" are defined herein to mean opposite directions which are substantially parallel to the direction of travel of the vehicle, and in FIG. 1 are to the lower left and upper right, respectively. "Aft" is synonymous with "rear". "Outboard" and "inboard" are opposed horizontal directions orthogonal to the direction of travel of the vehicle, and in FIG. 1 are to the lower right and upper left, respectively.

Figure 2:
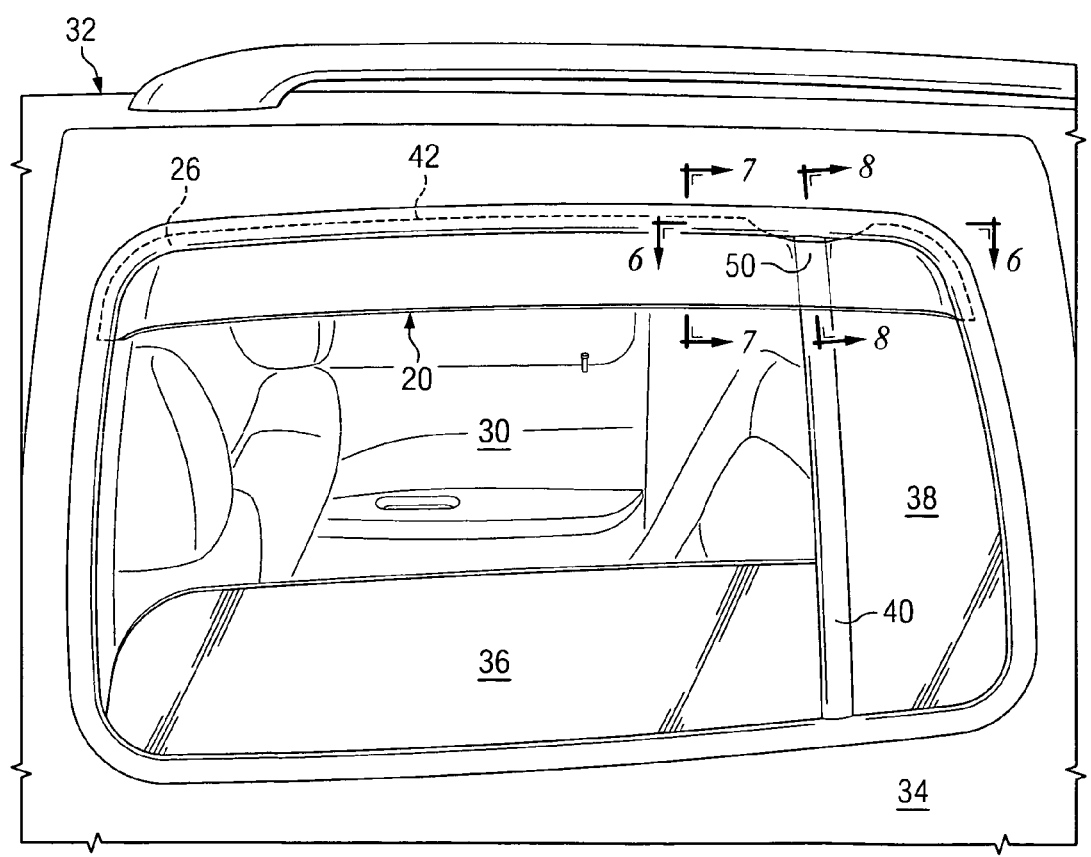
FIG. 2 is an elevational view of the wind deflector of FIG. 1, shown installed into a vehicle door, a flange component of the deflector being shown in phantom.

FIG. 2 shows the deflector 20 in the environment in which it is intended to be used: as installed in a window 30 of a vehicle 32. Usually but not always the window 30 will be an opening in a vehicle door 34. For it to be of the type for which the deflector 20 of the invention is adapted to be used, the window 30 must have multiple panes, a representative two of which are shown at 36 and 38. The panes 36 and 38 are separated from each other by an elongate and substantially upright pillar 40. At least one of the panes 36 is capable of being lowered into a hollow space in the door 34 beneath the window 30, so as to permit ventilation of the vehicle interior. Typically, the other pane 38 is not. This may occur, for example, where there is space in door 34 for pane 36 to be lowered into it, but no or insufficient space therein for pane 38. Pane 38, for example, may be disposed above a wheel well, and if panes 36 and 38 were joined, the entire downward displacement of the resultant unitary window pane would be unacceptably restricted or even prohibited. For this reason, vehicle designers have provided certain vehicle windows 30 with multiple panes of glass, some of which may be lowered and raised into and out of the vehicle door 34 and others of which cannot, or which can be raised and lowered only by smaller amounts or opened and closed in another way such as pivoting.

In FIG. 2, the flange 26 is shown in phantom, as it has been inserted into a window channel 42 on either side of the pillar 40.

Figure 3:
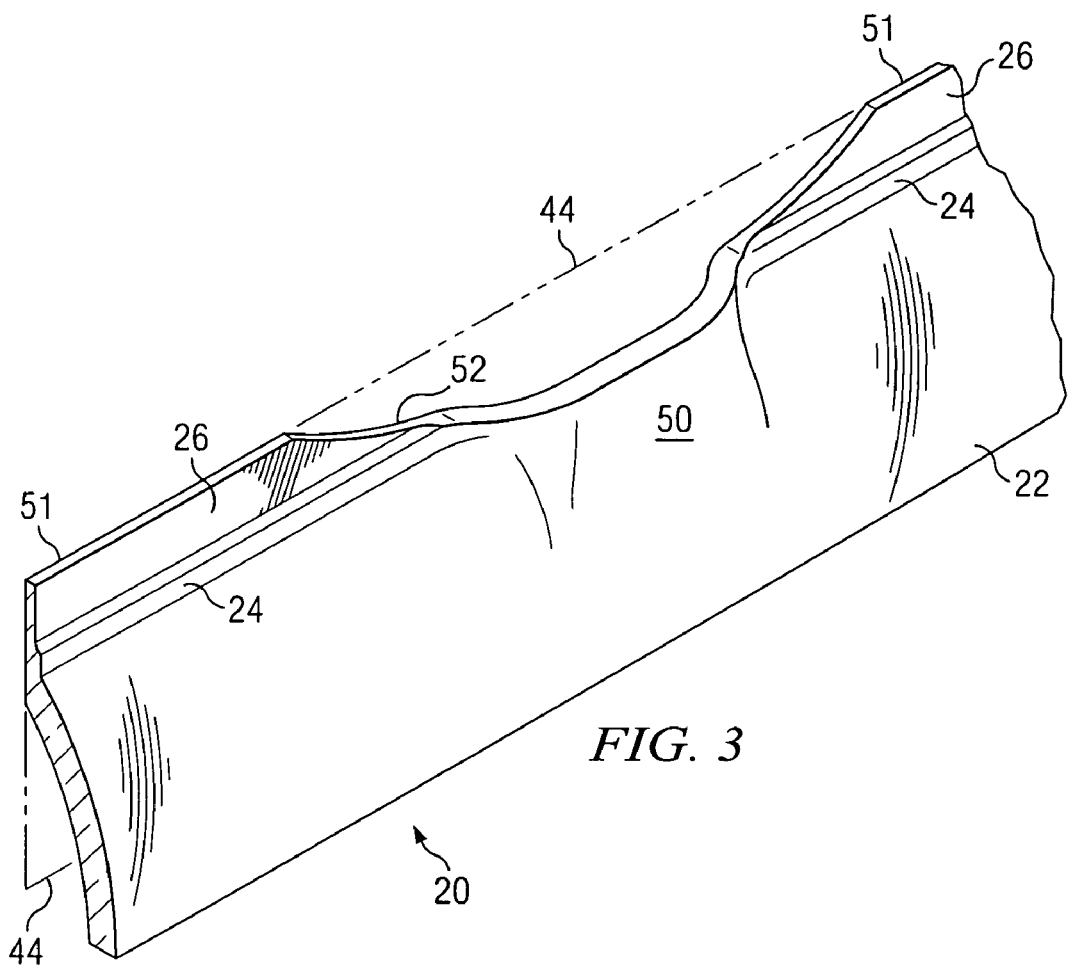
FIG. 3 is a detail of a bridge area of the deflector shown in FIG. 1.

Referring to FIG. 3, the upper margin 24 and the flange 26 generally conform to a conceptual vehicle window channel surface 44. Depending on vehicle design the surface 44 may be entirely flat or more commonly will be convexly curved. The surface may be cylindrically curved in just one dimension, but more commonly will be a Gaussian surface that is curved in two dimensions; typically any such curvature will be relatively slight. Surface 44 may be entirely vertical in orientation or may be somewhat slanted away from the vertical. Surface 44 is the surface along which or in parallel to which movable window pane 36 (FIG. 2) will slide when pane 36 is being raised or lowered. The conformance of flange 26 to the conceptual surface 44 is necessary for the flange 26 to best fit into the channel 42 of the vehicle window 34. The body 22 of the deflector 20, however, extends in an outboard direction from this conceptual surface 44, so that in use it will be outboard from the window panes 36 and 38.

Figure 4:
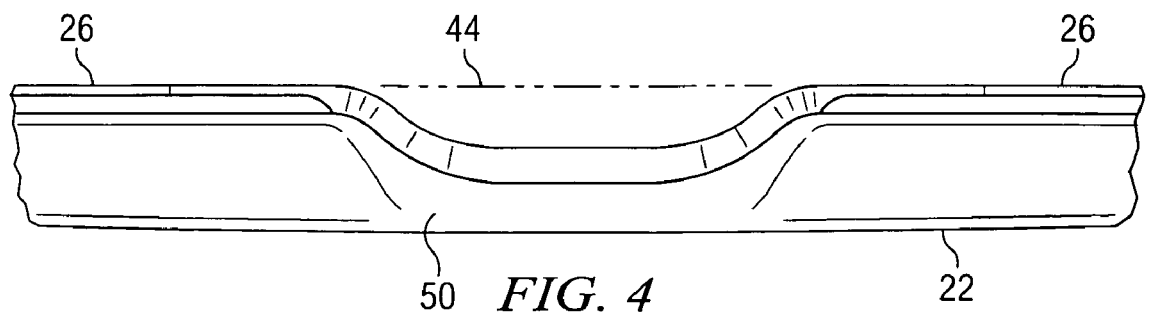
FIG. 4 is a top view of the bridge area shown in FIG. 3.

The deflector 20 includes at least one bridge 50 that is also an outward excursion of material from the conceptual surface 44. The bridge 50 is positioned along the length of the body 22 so that it, in use, will extend around the pillar 40, while allowing the flange 26 to be inserted into the channel 42 on either side of the pillar 40, as will be explained in more detail below. In the illustrated embodiment, as one proceeds downwardly, the bridge 50 begins to transition into the general, preferably convex surface of the body 22 until it blends into that surface and disappears. The bridge 50 is most prominent at the vertical position of upper margin 24. As best seen in FIG. 4, preferably the bridge 50 is formed by a curve and recurve of the molded material; these curves are tighter by at least one or even two orders of magnitude than any curve to which the conceptual surface 44 conforms.

Figure 5:
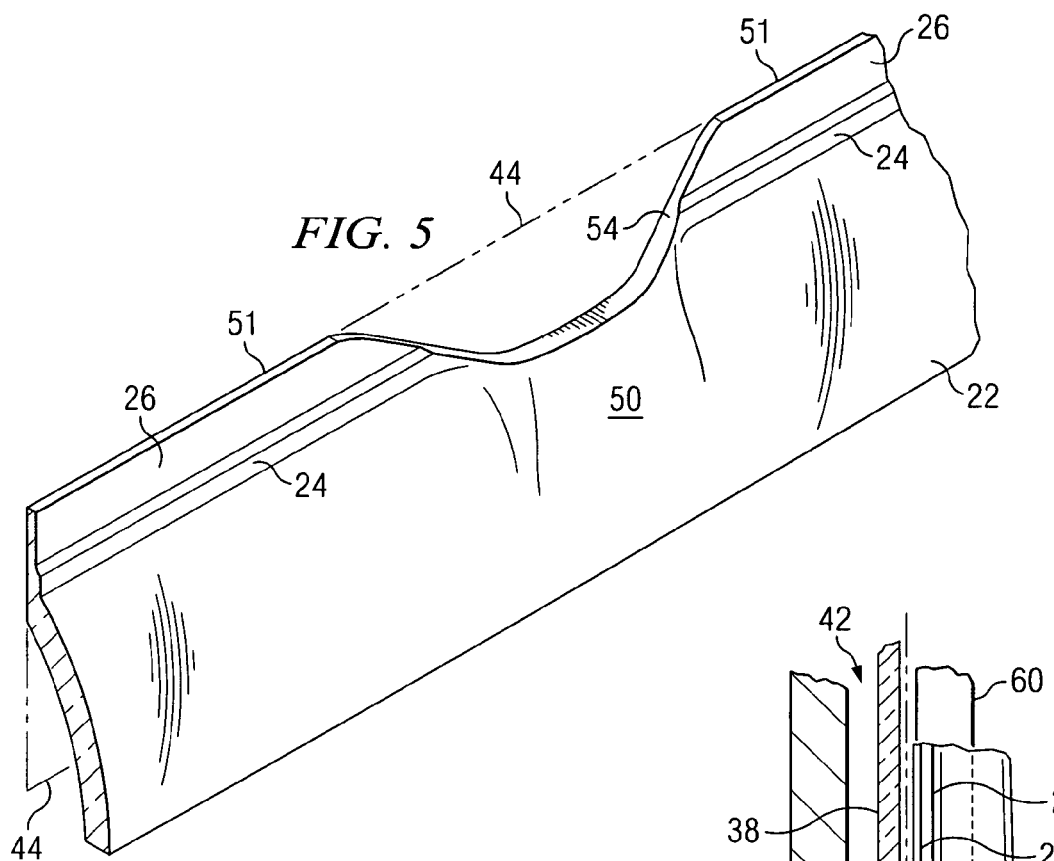
FIG. 5 is a detail of an alternative embodiment showing a different flange transitional profile in the area of the deflector bridge.

At the location of bridge 50, it is preferred that flange 26 be interrupted, as the window channel 42 at this location is usually completely occupied by the pillar 40. Various transitions between a full-height flange 26, and no flange, can be used. Typically and at most locations along the flange length, the flange 26 will have a full, uniform height from the body margin 24 to a free edge 51 of the flange 26. In FIG. 3, there is seen a longitudinal transition 52 from the full-height flange that is concavely arcuate in shape. This transitional shape can be easily obtained by grinding down the flange 26 at this location. In the preferred embodiment, since the inboard-outboard thickness of flange 26 is reduced through a grinding machining operation anyway, this is an easy manufacturing step. FIG. 5 shows an alternative transition 54 that has substantially linear, ramped transitions. Transitional profile 54 still permits easy collocation by the consumer/installer of the bridge 50 to the vehicle window pillar 40, but leaves less of the window near pillar 40 open to the elements.

FIG. 4 shows how the flange 26 closely conforms to the conceptual surface 44 (a dotted line in this view), but that the bridge 50 departs in an outboard direction from the surface 44 by enough that it will be able to fit around a pillar between two window glass panes.

Figure 6:
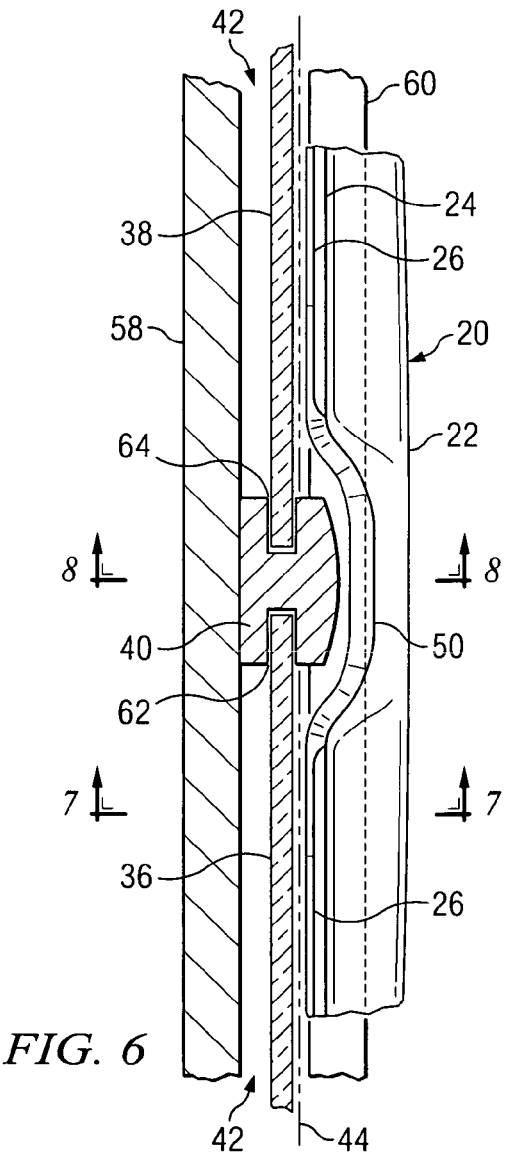
FIG. 6 is a horizontal sectional view taken substantially along line 6—6 in FIG. 2, but showing a vehicle door window in a raised position.

In the top section view shown in FIG. 6, there is seen an inboard frame member 58 and an outboard frame member 60, which in combination define an elongate window channel 42 between them. In this view, the pillar 40 is H-shaped and itself has channels 62, 64 for the respective edges of panes 36 and 38. The legs of the "H" may, for example, be formed in whole or in part by rubber weather strips or the like. The pillar 40 typically occupies the entire width (in an inboard-outboard direction) of the channel 42, necessitating an interruption of the flange 26 at this point. When the flange 26 of the deflector 20 is installed in the channel 42, the conceptual window channel surface 44 is bracketed by frame members 58, 60. The flange 26 is inserted into the channel 42 at a position outboard from glass panes 36, 38.

FIGS. 7 and 8 show vertical sectional views of the deflector 20 as installed in a window channel 42, with FIG. 8 taken through a pillar 40 and FIG. 7 taken elsewhere. FIG. 7 shows the insertion of flange 26 between window pane 36 and outer frame member 60 within window channel 42. FIG. 8 shows how the bridge 50 is formed as a lateral, outboard displacement of deflector material from the conceptual window channel surface 44, by an amount sufficient to avoid and be routed around the pillar 40. The amount of outboard excursion of bridge 50 will vary with the inboard-outboard thickness (measured left to right in FIG. 8) of pillar 40 and any manufacturing tolerance in the variation of that thickness. The bridge must avoid pillar 40 but preferably should be fitted as closely to it as is practicable. FIG. 8 also shows the transition 52 in the place of flange 26. The absence of the flange 26 at this location can permit some sheltering of the transition edge by the outer frame member 60 and removes a surface which otherwise could catch wind and moisture.

The present invention can be adapted to vehicle windows having three or more panes, and FIG. 9 shows such an adaptation. A deflector 90 has a flange 92 which has been interrupted at two, spaced-apart locations 94 and 96, corresponding to two window pillars of a vehicle window having three panes of glass (not shown). A convexly curved body 98 of the deflector 90 has a top margin 100 that lies within a conceptual vehicle window channel surface 102. The flange 92 extends from the top margin 100 along this conceptual surface 102. Surface 102 may be planar, but more typically is a Gaussian surface that is convexly curved in both fore-and-aft and inboard-outboard directions, and is dictated by the shape of the vehicle channel (not shown) into which the flange 92 is received.

A bridge 104 is provided at location 94 for fitting around a first window pillar (not shown) and a bridge 106 is provided at location 96 for fitting around a second window pillar (not shown). Bridges 104 and 106 are outboard excursions from the conceptual surface 102. In the embodiment illustrated in FIG. 9, the bridge transition profiles 108 and 110, through which the height of the flange 92 transitions from a full height to zero, are concavely curved in shape.

FIGS. 10 and 11 are isometric and top views of a deflector 120 which is more convexly curved in a fore-and-aft direction than the other embodiments illustrated herein. A flange 122 of this curved deflector 120 conforms to a conceptual window channel surface 124 that likewise has a greater curvature than surface 44. A pillar-spanning bridge 126 departs in an outboard direction from this surface 124. A body 128 of the deflector 120 curves outward from the surface 124 in a manner similar to body 22 of deflector 20 (FIGS. 1–3). This embodiment illustrates the application of the invention to vehicle window shapes that have a greater curvature.

FIG. 12 shows yet another embodiment of the invention. In this embodiment, a deflector 150 has a body 152 that is formed in a manner similar to body 22 (FIG. 1) and incorporates a bridge 154 that is similar in shape and position to bridge 50 (FIG. 1). But the deflector 150 has a forward flange portion 156 that has a full height 158 throughout its length, and an aft flange portion 160 that has a much-reduced height 162. The deflector 150 is adapted for use with those vehicles which will not allow a full-height flange to be inserted into that portion of the window channel where the nonmoving glass is located. Typically but not necessarily this nonmoving portion is aft or rearward of the pillar and corresponds to reduced-height flange portion 160. In yet another embodiment (not shown), the reduced-height flange portion 160 is missing altogether, and the aft or flangeless portion of the body 152 would instead be attached to the vehicle by any of several clip designs.

In summary, wind deflectors have been provided which span pillars between panes in a multiple-pane vehicle window, while continuing to take advantage of a method of affixation by which a flange is inserted into a channel of the vehicle window. While certain embodiments have been described above and illustrated in the appended drawings, the present invention is not limited thereto but only by the scope and spirit of the claims which follow.

I claim:

1. A wind deflector for a multiple-paned vehicle window, comprising:
    an elongate body having a length, an upper margin of the body generally conforming to a conceptual window channel surface;
    a flange extending upwardly from said upper margin to conform to said conceptual window channel surface and adapted to be inserted into a window channel of a vehicle, the window channel of the vehicle, when the flange is so inserted, substantially bracketing the conceptual window channel surface, wherein the window channel receives at least first and second window panes separated by a generally upright and elongate pillar;
    said upper margin of the body including at least one bridge, the bridge extending in a direction outboard from the vehicle and departing outwardly from said conceptual vehicle window channel surface, the bridge disposed at a position along the length of the body which corresponds to the position of the upright pillar between the first and second window panes, such that the flange of the wind deflector may be fitted into the window channel on both sides of the pillar.

2. The wind deflector of claim 1, wherein the flange is interrupted at a location along the length of the body which corresponds to the location of the window pillar.

3. The wind deflector of claim 1, wherein said conceptual window channel surface is convexly curved.

4. The wind deflector of claim 1, wherein said conceptual window channel surface is substantially flat.

5. The wind deflector of claim 1, wherein a portion of the flange extends forwardly from the upper margin of the body, where forward is substantially parallel to a direction of travel of the vehicle.

6. The wind deflector of claim 1, wherein a portion of the flange extends rearwardly from the upper margin of the body, where rearward is substantially parallel to a direction of travel of the vehicle.

7. The wind deflector of claim 1, wherein the flange is molded to be integral with the body.

8. The wind deflector of claim 7, wherein the body and flange are made of an acrylic plastic.

9. The wind deflector of claim 1, and further comprising a second bridge at a position along the length of the body different from the location of the first bridge, the position of the second bridge corresponding to a second pillar between the second pane of the vehicle window and a third pane of the vehicle window.

10. The wind deflector of claim 2, wherein the flange, at most positions along said length, has a substantially uniform height measured along said surface from the body margin to a free edge of the flange.

11. The wind deflector of claim 2, wherein the flange forms a transitional profile near the bridge and along the length of the body which is arcuate, wherein a height of the flange in the location of said transitional profile decreases as the location of the bridge is approached.

12. The wind deflector of claim 2, wherein the flange comprises a first portion and a second portion spaced from the first portion by the bridge, a height of the first portion as measured from the body margin to a free edge of the first portion being substantially greater than a height from the body margin to a free edge of the second portion.

* * * * *